United States Patent [19]

Narula

[11] Patent Number: 5,075,265
[45] Date of Patent: Dec. 24, 1991

[54] PREPARATION OF ALUMINUM OXYNITRIDE FROM ORGANOSILOXYDIHALOALANES

[75] Inventor: Chaitanya K. Narula, Ann Arbor, Mich.

[73] Assignee: Ford Motor Company, Dearborn, Mich.

[21] Appl. No.: 624,792

[22] Filed: Dec. 10, 1990

[51] Int. Cl.$^5$ .............................................. C04B 35/58
[52] U.S. Cl. ........................................ 501/96; 501/98; 501/153; 423/385; 423/631; 427/419.7
[58] Field of Search ........................... 501/153, 96, 98; 423/385, 631; 427/419.7

[56] References Cited

U.S. PATENT DOCUMENTS 4,241,000 12/1980 McCauley et al. ................... 264/65
4,720,362 1/1988 Gentilman et al. ................... 501/98
4,855,264 8/1989 Mathers et al. ...................... 501/98
4,950,558 8/1990 Sarin ................................... 428/698

OTHER PUBLICATIONS

Chemical Abstracts, 52, 2742 (1958).

Primary Examiner—William R. Dixon, Jr.
Assistant Examiner—Paul Marcantoni
Attorney, Agent, or Firm—Charles H. Ellerbrock; Roger L. May

[57] ABSTRACT

Aluminum oxynitride is prepared by the pyrolysis of an organosiloxydihaloalane such as trimethylsiloxydichloroalane in the presence of a nitrogen-containing atmosphere. The organosiloxydihaloalane may conveniently be prepared by reacting together an aluminum halide and at least one disiloxane.

18 Claims, No Drawings

PREPARATION OF ALUMINUM OXYNITRIDE FROM ORGANOSILOXYDIHALOALANES

FIELD OF THE INVENTION

This invention relates generally to the preparation of aluminum oxynitride from organosiloxydihaloalanes. More particularly, the invention relates to the preparation of pyrolyzable organosiloxydihaloalanes, and to the pyrolysis of such materials to produce aluminum oxynitride.

BACKGROUND OF THE INVENTION

Organometallic precursor processing has been used in recent years to prepare advanced materials such as aluminum nitride, aluminum oxynitride, titanium nitride, silicon carbide, silicon nitride, and boron nitride. This method has several advantages over classical techniques, e.g., relatively low temperature processing requirements, ease of control for maintaining high purity, and formability of the ultimately produced advanced materials into fibers, coatings, films, etc. Generally, the organometallic precursors are transformed into the corresponding advanced materials by a pyrolytic process. Aluminum oxynitride is a particularly useful advanced material having several desirable properties such as, for example, a high melting point, high hardness, excellent strength, high termal conductivity, optical clarity, and nonreactivity with a variety of other materials. These properties make aluminum oxynitride particularly suited for the preparation of electronic substrates, optical windows, vehicle armor, radar and infrared domes, crucibles, cutting tools, abrasive grit, etc.

The conventional method for preparing aluminum oxynitride involves the high temperature reaction of aluminum nitride and aluminum oxide. U.S. Pat. Nos. 4,241,000 to McCauley et al. and 4,720,362 to Gentilman et al. disclose admixing finely ground aluminum oxide and aluminum nitride, and ball milling the mixture in the presence of an alcohol. The resultant mixture is then dried, formed, and heated to a temperature in the range from 1,600° C. to 1,800° C., to form aluminum oxynitride.

U.S. Pat. No. 4,855,264 to Mathers et al. discloses an alternative method for making aluminum oxynitride, wherein alumina and carbon are heated in a nitrogen atmosphere to prepare aluminum nitride, which further reacts with the alumina at a temperature from 1,600° C. to 1,900° C. to form aluminum oxynitride.

U.S. Pat. No. 4,950,558 to Sarin discloses yet another method for preparing a coating of aluminum oxynitride by a chemical vapor deposition process. Aluminum chloride, ammonia, and carbon dioxide are reacted at a temperature from 900° C. to 1,500° C. to form the aluminum oxynitride.

In light of the prior art, there is recognized a need for developing a process to prepare aluminum oxynitride at a lower temperature.

In Doklady Akademii Nauk USSR, 114, 1033 (1957) and Chemical Abstracts, 52, 2742 (1958), a process is disclosed for reacting a hexaalkyldisiloxane and an aluminum halide, with the removal of trialkylhalosilane, to prepare a trialkylsiloxydihaloalane. The article does not, however, suggest that the trialkylsiloxydihaloalane would be useful for preparing aluminum oxynitride by a pyrolytic process.

It would be desirable to prepare aluminum oxynitride by a simple pyrolysis process which is carried out at a temperature lower than the reaction temperatures disclosed in the prior art.

SUMMARY OF THE INVENTION

Accordant with the present invention, a process for preparing aluminum oxynitride by pyrolysis has surprisingly been discovered. The process comprises heating an organosiloxydihaloalane, in the presence of a nitrogen-containing atmosphere, to a temperature and for a period of time sufficient to pyrolyze the organosiloxydihaloalane.

The invention also contemplates a process for preparing aluminum oxynitride, wherein an aluminum halide is reacted with at least one disiloxane to form an organosiloxydihaloalane which is thereafter pyrolyzed.

The ratio of aluminum halide to disiloxane may vary over wide limits, resulting in a range of efficiencies for the production of an organosiloxydihaloalane. The reaction for preparing the organosiloxydihaloalane may be carried out in the presence of a solvent, and is generally conducted within a temperature range from about −100° C. to about 100° C. Pyrolysis of the organosiloxydihaloalane to produce aluminum oxynitride generally occurs at temperatures greater than about 800° C., in contrast to the reactions disclosed in the prior art for the preparation of aluminum oxynitride which occur at substantially higher temperatures.

The process of the present invention is particularly suited for preparing aluminum oxynitride for the manufacture of abrasive grit, protective coatings, electronic substrates, etc.

DETAILED DESCRIPTION OF THE PREFERRED EMBODIMENT

The present invention is directed to the pyrolysis of an organosiloxydihaloalane to prepare aluminum oxynitride. The organosiloxydihaloalane may be prepared by reacting an aluminum halide with at least one disiloxane in the presence of a nitrogen-containing atmosphere.

The first reactant useful for preparing the organosiloxydihaloalanes of the present invention is an aluminum halide. Aluminum halides are well known to those ordinarily skilled in the chemical arts, and include compounds such as, for example, aluminum chloride, aluminum bromide, ethylaluminum dichloride, diethylaluminum chloride, ethylaluminum sesquichloride, aluminum fluoride, aluminum iodide, and the like. A preferred aluminum halide is aluminum chloride, which may be produced by reacting purified chlorine gas with molten aluminum. Details concerning the manufacture and characteristics of aluminum halides are more fully set forth in Kirk-Othmer "Concise Encyclopedia of Chemical Technology," John Wiley & Sons, New York (1985), p. 79.

The second reactant for use in preparing the organosiloxydihaloalanes of the present invention comprises one or more disiloxanes including, but not necessarily limited to hexamethyldisiloxane, tetramethyldisiloxane, hexaphenyldisiloxane, hexacyclohexyldisiloxane, 1,3-dimethyldisiloxane, hexaethyldisiloxane, hexapropyldisiloxane, 1,3-bis(p-phenoxyphenyl)-1,3-dimethyl-1,3-diphenyldisiloxane, 1,3-diallyltetramethyldisiloxane, 1,3-dibenzyltetramethyldisiloxane, 1,1,3,3-tetramethyldisiloxane, and the like, as well as mixtures thereof. A preferred disiloxane is hexamethyldisiloxane.

Preparation of the organosiloxydihaloalanes of the present invention conveniently may be carried out by admixing the aluminum halide and disiloxane reactants under rigorously anhydrous conditions. The mixture of reactants may also include a solvent which does not react with the aluminum halide such as, for example, dichloromethane, carbon tetrachloride, toluene, benzene, pentane, hexane, heptane, octane, cyclopentane, cyclohexane, tetrachloroethylene, dichlorobenzene, chlorobenzene, etc. A preferred solvent is dichloromethane. The solvent may comprise up to about 80% by weight of the reaction mixture. The ratio of aluminum halide to disiloxane employed in the reaction mixture may vary on a molar basis from about 1:0.5 to about 1:3. The reaction is generally effected at temperatures in the range from about $-100°$ C. to about $100°$ C. The time required for complete reaction to occur is not sharply critical, and may vary over wide limits from several minutes to several hours.

Thus, the organosiloxydihaloalanes are formed from the reaction mixture, with the liberation of an organohalosilane byproduct, as a soluble precursor which may be vacuum stripped to form a free flowing powder. Examples of organosiloxydihaloalanes which may be produced by the inventive process include, but are not necessarily limited to, trimethylsiloxydichloroalane, triethylsiloxydichloroalane, triphenylsiloxydichloroalane, dimethylhydrosiloxydichloroalane, diphenylhydrosiloxydichloroalane, and the like, as well as mixtures thereof. A preferred organosiloxydihaloalane is trimethylsiloxydichloroalane, produced by the reaction between aluminum chloride and hexamethyldisiloxane.

The organosiloxydihaloalanes may be pyrolyzed in the presence of a nitrogen-containing atmosphere according to the present invention to form aluminum oxynitride. Suitable nitrogen-containing atmospheres include, but are not necessarily limited to, ammonia and nitrogen, as well as mixtures thereof. Pyrolysis of the organosiloxydihaloalanes to form aluminum oxynitride conveniently occurs at a temperature of at least about $800°$ C, which is significantly below the range of temperatures disclosed in the prior art for forming aluminum oxynitride. The time required for complete pyrolysis may vary over wide limits, depending upon the rate at which the organosiloxy-dihaloalane is heated, from several minutes to several hours.

Thus, the organosiloxydihaloalanes of the present invention may be formed into particles, fibers, bulk solids, etc., and thereafter pyrolyzed to form aluminum oxynitride abrasive grit, reinforcing fibers, cutting tools, and the like.

Conveniently, the process for preparing aluminum oxynitride is also suitable for depositing a coating of aluminum oxynitride onto a substrate. The organosiloxydihaloalane may be applied to the surface of the substrate by any conventional method, such as by molding, dipping, or casting, and thereafter pyrolyzed to form the aluminum oxynitride coating.

Alternatively, a layer of the organosiloxydihaloalane may be formed on the surface of the substrate by causing the pyrolyzable material to precipitate from a reaction mixture and simultaneously deposit directly onto the substrate, after which the organosiloxydihaloalane is pyrolyzed to form the aluminum oxynitride coating. Such coatings are useful, for example, for lining parts of apparatus to be protected against corrosion, abrasion, or oxidation at high temperatures.

EXAMPLE 1

Preparation of Organosiloxydihaloalane

Hexamethyldisiloxane (about 7.4 9, 45.6 mmol) is added utilizing a syringe to a stirred solution of aluminum trichloride (about 6.08 g, 45.6 mmol) in dichloromethane (about 130 g) maintained at $-78°$ C. After complete addition, stirring is continued for about 30 minutes, resulting in a clear mixture which is then warmed to about room temperature while the volatile components are removed utilizing a vacuum. The solid residue is maintained at about room temperature under a vacuum for about an additional 30 minutes. The resulting product is identified by spectral analysis to be trimethylsiloxydichloroalane (about 18.8 g).

EXAMPLE 2

Pyrolysis of Organosiloxydihaloalane

A quantity of trimethylsiloxydichloroalane, as prepared in Example 1, is placed in a quartz tube connected to a system which maintains an atmosphere comprising about 50% by weight ammonia and about 50% by weight nitrogen within the tube. The temperature of the trimethylsiloxydichloroalane is slowly raised to about $800°$ C. After complete pyrolysis, a white-colored powder remains which is identified by X-ray powder diffraction as aluminum oxynitride.

EXAMPLE 3

Pyrolysis of Organosiloxydihaloalane

A quantity of trimethylsiloxydichloroalane, as prepared in Example 1, is place in a quartz tube connected to a system which maintains an atmosphere comprising a variable mixture of nitrogen and ammonia. Initially, an atmosphere of essentially pure nitrogen is employed as the temperature of the trimethylsiloxydichloroalane is raised to about $150°$ C. It is observed that the trimethylsiloxydichloroalane softens to a consistency suitable for forming films, fibers, etc. The trimethylsiloxydichloroalane experiences about a 46% weight loss in the $50°$ C. to $140°$ C. temperature range, and about an additional 22% weight loss in the $140°$ C. to $510°$ C. temperature range. Votatile components given off during the heating procedure are identified as containing chlorotrimethylsilane. Thereafter, the pyrolysis atmosphere is adjusted to about 50% nitrogen and about 50% ammonia, and the temperature is slowly raised to about $800°$ C. Upon completion of the pyrolysis process, a white-colored powder remains which is identified by X-ray powder diffraction to be aluminum oxynitride.

These examples may be repeated with similar success by substituting the generically or specifically described reactants and/or reaction conditions for those actually used in the preceding examples.

From the foregoing description, one ordinarily skilled in the art can easily ascertain the essential characteristics of this invention, and without departing from the spirit and scope thereof, can make various changes and modifications to the invention to adapt it to various usages and conditions.

What is claimed is:

1. A process for preparing aluminum oxynitride by pyrolysis, comprising heating an organosiloxydihaloalane, in the presence of a nitrogen-containing atmosphere, to a temperature and for a period of time sufficient to pyrolyze the organosiloxydihaloalane.

2. The process for preparing aluminum oxynitride by pyrolysis according to claim 1, wherein the organosiloxydihaloalane is trimethylsiloxydichloroalane.

3. The process for preparing aluminum oxynitride by pyrolysis according to claim 1, wherein the organosiloxydihaloalane is heated to a temperature of at least about 800° C.

4. The process for preparing aluminum oxynitride by pyrolysis according to claim 1, wherein the nitrogen-containing atmosphere Comprises a gas selected from the group consisting of ammonia, nitrogen, and mixtures thereof.

5. A process for preparing aluminum oxynitride by pyrolysis, comprising heating trimethylsiloxydichloroalane, in the presence of a nitrogen-containing atmosphere comprising a gas selected from the group consisting of ammonia, nitrogen, and mixtures thereof, to a temperature of at least about 800° C. and for a time sufficient to pyrolyze the trimethylsiloxydichloroalane.

6. A process for preparing aluminum oxynitride, comprising the steps of:
   A) contacting an aluminum halide with at least one disiloxane, at a temperature and for a period of time sufficient to prepare an organosiloxydihaloalane; and
   B) heating the organosiloxydihaloalane, in the presence of a nitrogen-containing atmosphere, to a temperature and for a period of time sufficient to pyrolyze the organosiloxydihaloalane.

7. The process for preparing aluminum oxynitride according to claim 6, wherein the aluminum halide aluminum chloride.

8. The process for preparing aluminum oxynitride according to claim 6, wherein the disiloxane is hexamethyldisiloxane.

9. The process for preparing aluminum oxynitride according to claim 6, wherein step A is conducted in the presence of a solvent.

10. The process for preparing aluminum oxynitride according to claim 9, wherein the solvent is dichloromethane.

11. The process for preparing aluminum oxynitride according to claim 6, wherein step A is conducted at a temperature from about −100° C. to about 100° C.

12. The process for preparing aluminum oxynitride according to claim 6, wherein step B is conducted at a temperature of at least about 800° C.

13. The process for preparing aluminum oxynitride according to claim 6, wherein the nitrogen-containing atmosphere comprises a gas selected from the group consisting of ammonia, nitrogen, and mixtures thereof.

14. A process for preparing aluminum oxynitride, comprising the steps of:
   A) contacting aluminum chloride with at least one disiloxane including hexamethyldisiloxane at a temperature from about -100° C. to about 100° C. and for a period of time sufficient to prepare trimethylsiloxydichloroalane; and
   B) heating the trimethylsiloxydichloroalane, in the presence of a nitrogen-containing atmosphere comprising a gas selected from the group consisting of ammonia, nitrogen, and mixtures thereof, to a temperature of at least about 800° C. and for a time sufficient to pyrolyze the trimethylsiloxydichloroalane.

15. A process for applying a coating of aluminum oxynitride to a surface of a substrate, comprising the steps of:
   A) contacting an aluminum halide with at least one disiloxane, at a temperature and for a period of time sufficient to prepare an organosiloxydihaloalane;
   B) applying the organosiloxydihaloalane to the surface of the substrate; and
   C) heating the organosiloxydihaloalane, in the presence of a nitrogen-containing atmosphere, to a temperature and for a period of time sufficient to pyrolyze the organosiloxydihaloalane.

16. The process for applying a coating of aluminum oxynitride to a surface of a substrate according to claim 15, wherein step A and step B are conducted simultaneously.

17. A process for applying a coating of aluminum oxynitride to a surface of a substrate, comprising the steps of:
   A) contacting aluminum chloride with at least one disiloxane including hexamethyldisiloxane at a temperature from about −100° C. to about 100° C. and for a period of time sufficient to prepare trimethylsiloxydichloroalane;
   B) applying the trimethylsiloxydichloroalane to the surface of the substrate; and
   C) heating the trimethylsiloxydichloroalane, in the presence of a nitrogen-containing atmosphere comprising a gas selected from the group consisting of ammonia, nitrogen, and mixtures thereof, to a temperature of at least about 800° C. and for a time sufficient to pyrolyze the trimethylsiloxydichloroalane.

18. The process for applying a coating of aluminum oxynitride to a surface of a substrate according to claim 17, wherein step A and step B are conducted simultaneously.

* * * * *